United States Patent Office 3,551,486
Patented Dec. 29, 1970

3,551,486
PROCESS FOR PREPARING
DICYCLOHEXYLAMINE
Jack M. Solomon, West Caldwell, Bernard Isbitsky, Jr., Garfield, and Bernard R. Bluestein, Glen Rock, N.J., assignors to Witco Chemical Company, Inc., New York, N.Y., a corporation of Delaware
No Drawing. Filed June 6, 1968, Ser. No. 734,860
Int. Cl. C07c 85/08
U.S. Cl. 260—563    4 Claims

ABSTRACT OF THE DISCLOSURE

Process of preparing dicyclohexylamine from cyclohexanone which comprises passing cyclohexanone, together with ammonia and hydrogen, in the vapor phase at atmospheric pressure, over a heated nickel on kieselguhr (or other inert carrier) catalyst.

---

Our invention is directed to an improved process for preparing dicyclohexylamine from cyclohexanone.

Processes for the preparation of dicyclohexylamine from cyclohexanone, broadly speaking, have long been known and have been disclosed in various patents and other publications. In certain instances, the known processes have involved contacting cyclohexanone in admixture with cyclohexylamine, at atmospheric or superatmospheric pressures, with hydrogen and with a palladium or platinum (or the oxides thereof) catalyst at temperatures up to about 212° F. In other procedures, cyclohexanol, in admixture with ammonia and hydrogen, has been passed into contact with a foraminate nickel/aluminum catalyst, at temperatures of the order of 390° F., under superatmospheric conditions, e.g. 17 atmospheres gauge. These, and other processes, for the production of dicyclohexylamine, are shown in U.S. Patents Nos. 1,982,-985; 2,636,902; 3,154,580; 3,219,704 and 3,239,562. In general, such known procedures possess one or more disadvantages in that they require the utilization of substantial superatmospheric pressures; or they require the use of relatively expensive catalysts; or they require quite long reaction times; or they produce low yields of dicyclohexylamine or poor selectively and high proportions of undesired byproducts.

The process of our present invention has a number of advantages in that it produces excellent yields of dicyclohexylamine from cyclohexanone at atmospheric or substantially atmospheric pressure, utilizing a catalyst which is readily prepared and is economical in cost. In general, the process of our invention, involves passing cyclohexanone, together with ammonia and hydrogen, in the vapor phase at substantially atmospheric pressure, over a heated nickel on an inert carrier catalyst.

The nickel on inert carrier catalyst can be prepared in various ways which are well known to the art. The nickel content should be at least 20% and advantageously constitutes from about 40 to 65% by weight of the catalyst, but it is especially desirable that the nickel content constitute about 58%. The nickel is carried on an inert support as, for example, kieselguhr, gamma alumina, pumice, asbestos and silica gel. Particularly preferred is kieselguhr. One illustrative procedure for producing a suitable nickel catalyst is as follows:

Nickel nitrate is dissolved in a minimum amount of distilled water to which is added an amount of kieselguhr such that the final catalyst product contains about 42% by weight of kieselguhr. The mixture is stirred and heated to dryness and the powder residue is shaped into ⅛" tablets and calcined in the presence of air at 600° F. for 2 to 4 hours.

The molar ratios of the ammonia and of the hydrogen to the cyclohexanone utilized in the reaction are variable.

In the case of the molar ratio of the ammonia to the cyclohexanone, a molar ratio of about 0.4 to 1 of the ammonia to 1 of the cyclohexanone is utilized, with a molar ratio of about 0.5 to 0.7 of the ammonia to 1 of the cyclohexanone being particularly desirable.

In the case of the molar ratios of the hydrogen to the cyclohexanone, a molar ratio of about 2 to 4 of the hydrogen to 1 of the cyclohexanone is utilized, with a molar ratio of about 2.8 to 3.5 of the hydrogen to 1 of the cyclohexanone being particularly desirable.

The contact times between the reaction mixture and the catalyst are variable but, in general, are of short duration, generally in the range of 1 to 30 seconds. In most cases, contact times of from about 5 to 15 seconds are satisfactory, with about 10 seconds being particularly desirable, depending, however, on the specific activity of the catalyst and the temperature at which the reaction is carried out. Reaction temperatures will, in the usual case, range from about 300 to 700° F., advantageously from about 475 to 525° F. with about 500° F. being substantially optimum in most cases. Unreacted material can, of course, be recycled.

The following examples are illustrative of the practice of the process of our invention but are not to be construed in any way as limitative thereof since various changes may be made in the light of the guiding principles and teachings contained herein.

EXAMPLE 1

Cyclohexanone is vaporized and admixed with gaseous ammonia and hydrogen (in molar ratios of (a) 0.5:1 of the ammonia to the cyclohexanone and (b) 3:1 of the hydrogen to the cyclohexanone) and passed at atmospheric pressure into contact with a nickel on kieselguhr catalyst (58% nickel on kieselguhr) at a temperature of about 500° F. for about 10 seconds. A yield of about 64% dicyclohexylamine based on the amount of conversion is obtained.

EXAMPLE 2

The process described in Example 1 is carried out except that the molar ratios of the ammonia and of the hydrogen to the cyclohexanone are, respectively, 0.6:1 and 3.5:1, and the reaction temperature is about 535–550° F.

We claim:

1. A process for the preparation of dicyclohexylamine which comprises passing cyclohexanone, together with ammonia and hydrogen, in the vapor phase at substantially atmospheric pressure, over a nickel on an inert carrier catalyst, at a contact time of from about 1 to 30 seconds wherein the molar ratio of the ammonia to the cyclohexanone is from about 0.4 to 1 of the ammonia to 1 of the cyclohexanone, and the molar ratio of the hydrogen to the cyclohexanone is from about 2 to 4 of the hydrogen to 1 of the cyclohexanone, while maintaining the temperature between 300 and 700° F.

2. The process of claim 1, in which the temperature is about 500° F. and the contact time of the reaction mixture with the catalyst is about 5 to 15 seconds.

3. The process of claim 2, in which the inert carrier is kieselguhr.

4. The process of claim 2, in which the content of nickel in the nickel on kieselguhr catalyst is about 58%.

References Cited

UNITED STATES PATENTS 1,762,742   6/1930   Reppe _____ 260—563X

CHARLES B. PARKER, Primary Examiner

D. R. PHILLIPS, Assistant Examiner